Feb. 3, 1931. W. GANZ 1,790,656
LOCK
Filed June 15, 1927
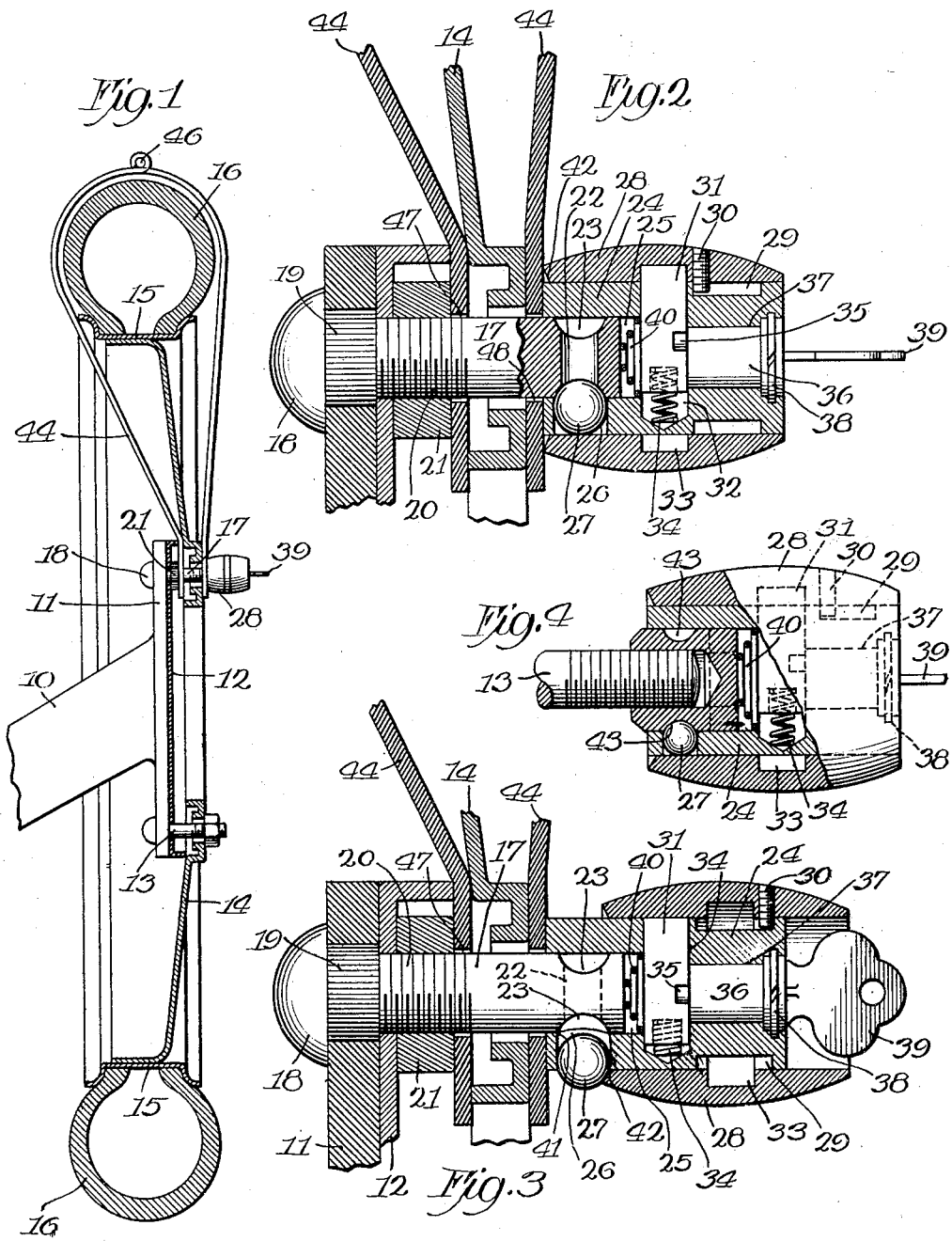

Patented Feb. 3, 1931

1,790,656

UNITED STATES PATENT OFFICE

WILLIAM GANZ, OF CHICAGO, ILLINOIS

LOCK

Application filed June 15, 1927. Serial No. 198,997.

The principal object of this invention is to provide a simple lock fastening that will effectually prevent the theft of autombile accessories and the like and that may be produced at low cost.

A further object of the invention is to provide means that will not only prevent the theft of the spare wheel or tire rim, but will also prevent the theft of a tire from the spare wheel or rim.

For the purpose of illustration, a selected embodiment of the invention is illustrated in the accompanying drawings in which Fig. 1 is a vertical section through a conventional spare wheel and spare wheel carrier with the invention applied thereto;

Figs. 2 and 3 are enlarged sectional views through the lock device and a portion of the spare wheel and spare wheel carrier, showing the parts in different position, and Fig. 4 is a view similar to Fig. 2, showing the lock device applied in connection with a nut threaded on the bolt.

But neither this specific illustration nor the corresponding specific description are intended to require a limited construction of the claims.

Referring to Figs. 1, 2 and 3, 10 indicates a bracket forming a part of the conventional spare wheel carrier having a head 11 at its free end equipped with a flanged disk 12, and a plurality of bolts or studs 13 for securing a spare wheel body 14 to the carrier. The spare wheel body is equipped with a rim 15 carrying a tire 16, both of conventional form.

According to this embodiment of the invention one of the conventional studs 13 is replaced by a special stud 17 (Figs. 2 and 3) having a fixed head 18, a serrated portion 19 to engage the head 11, a threaded portion 20 adapted to receive a nut 21 for securing the bolt, the flange 11 and the disk 12 together, and an unthreaded portion provided with a transverse bore 22 having spherical counterbores 23.

A lock barrel 24 has a longitudinal bore 25 adapted to receive the end of the special bolt and has also a transverse bore 26 of greater diameter than the wall of the bore 25 and intersecting that bore adjacent to one end of the barrel. A lock bolt in the form of a ball 27 is mounted in the bore 26, and in the position shown in Fig. 2 serves to lock the barrel to the special bolt 17, and in the position shown in Fig. 3 releases the bolt.

The ball 27 is held in the position shown in Fig. 2 by a sleeve 28 having limited sliding movement on the barrel 24 by virtue of the slot 29 and the pin 30.

The sleeve 28 is locked in the position shown in Fig. 2 by a lock bolt 31 in the form of a bar mounted to reciprocate in a transverse bore 32 at about the middle of the lock barrel, and which bolt is received in a groove 33 in the bore of the sleeve 28 when in locking position, as shown in Fig. 2. A spring 34 in the bottom of the bore 32 tends to hold bolt 31 in locked position.

The bolt 31 is controlled by an eccentric driving pin 35 on a lock plug 36 equipped with suitable tumblers (not shown) and rotatably mounted in a reduced extension 37 of the bore 25. The plug is secured in the barrel by a split ring 38 seated in opposed grooves in the plug and barrel. A key 39 serves to control the tumblers and to provide a handle for rotating the plug 36 and hence shifting the bolt 31.

A spring 40 interposed between the end 17 and the shoulder formed by the juncture of the bore 25 in the extension 37 serves to prevent rattling.

The inner edge of the bore 26 is reduced slightly, as indicated at 41, to prevent the ball 27 from escaping into the bore 25. The sleeve 28 has a tapered face 42 that overhangs the ball 27 when the sleeve has reached its extreme movement to the right and, thereby prevents the ball from escaping by a downward movement in Fig. 3.

When it is desired to apply locking device the sleeve is put in the position shown in Fig. 3, the barrel is then pushed over the end of the stud and the sleeve moved to the left in Fig. 2, until the bolt 31 snaps into the groove 33. The parts will be securely locked in this position until the plug 36 is rotated by the proper key 39.

In another application of this invention the locking device is made substantially as shown in Figs. 2 and 3, except that the proportions are made suitable for receiving a nut to be threaded on a bolt or stud. The nut is provided with a groove 43 adapted to receive the ball 27 or a plurality of such balls, in which case the device forms a shell for the nut to prevent the application of a wrench.

In order to prevent the theft of the tire from the rim, or the rim from the wheel, use is made of a strap 44 preferably of steel hinged at 46, and shaped into a loop substantially as shown, for extending from one of the fastening bolts outwardly along one side around the tire inwardly along the other side. The ends of the strap are perforated at 47 and 48 to receive the bolt 17 whereby the strap is locked to the tire or rim carrier and prevents the rim or tire from being separated until the lock device is removed.

I claim as my invention:

1. In a device of the class described, a stud having a depression in its side adjacent to one end, a lock barrel having a bore to receive the stud and a transverse bore intersecting the first bore, a ball in the transverse bore having a diameter greater than the length of the bore whereby it is adapted to project into the depression to fasten the barrel to the stud, a sleeve slidably and non-rotatably mounted on the barrel and adapted in one position to hold the ball in the depression and lock mechanism for securing the sleeve in that position.

2. In a spare wheel carrier, a bracket, studs projecting from the bracket for securing a spare wheel, one of said studs having a depression in its side adjacent to one end, said depression terminating short of the end of said stud, a lock barrel having a bore to receive the last mentioned stud, a sleeve on said barrel, means carried by the barrel adapted to enter the depression in the stud to secure the barrel thereto, and lock mechanism for controlling said means and for locking said sleeve on said stud.

3. In a device of the class described, a lock barrel having a longitudinal bore and a transverse bore intersecting the longitudinal bore, a ball movable in the transverse bore having a diameter greater than the length of the bore, a sleeve slidable and non-rotatably mounted on said barrel and adapted to force the ball to project into the longitudinal bore and lock mechanism for holding the sleeve.

In testimony whereof I affix my signature.

WILLIAM GANZ.